United States Patent [19]
Ahn

[11] Patent Number: 5,992,608
[45] Date of Patent: Nov. 30, 1999

[54] AUTOMATIC PALLET CHANGER FOR MACHINE TOOLS WITH SPLIT GRIPPER ARMS

[75] Inventor: Jae Bong Ahn, Changwon, Rep. of Korea

[73] Assignee: Daewoo Heavy Industries, Incheon, Rep. of Korea

[21] Appl. No.: 08/766,316

[22] Filed: Dec. 13, 1996

[30] Foreign Application Priority Data

Dec. 22, 1995 [KR] Rep. of Korea ....................... 95-54823

[51] Int. Cl.⁶ .................................................. B65G 47/00
[52] U.S. Cl. .......................................... 198/346.1; 29/33 P
[58] Field of Search ................................ 198/346.1, 414; 29/33 P

[56] References Cited

U.S. PATENT DOCUMENTS

| 4,423,806 | 1/1984 | Ogasawara | 198/346.1 |
| 4,673,076 | 6/1987 | Mattson | 198/346.1 |
| 4,863,319 | 9/1989 | Winkler et al. | 409/134 |
| 5,531,004 | 7/1996 | Ahn | 29/33 P |

FOREIGN PATENT DOCUMENTS 362044348A  2/1987  Japan .

63-62633A  3/1988  Japan .

*Primary Examiner*—Robert P. Olszewski
*Assistant Examiner*—Thuy V. Tran
*Attorney, Agent, or Firm*—Staas & Halsey

[57] ABSTRACT

An automatic pallet changer is used to change an inner pallet lying inside a cutting compartment of a machine tool with an outer pallet located outside the cutting compartment. The pallet changer includes a housing and an arm base elevatably and rotatably fitted to the housing, the arm base having a rotary shaft and a support head mounted on the top of the rotary shaft. A first pair of split gripper arms are pivoted at their proximal ends to the support head of the arm base for swinging movement between an idle position wherein the first pair of arms lie side to side and an acting position wherein the first pair of arms are placed end to end. Likewise, a second pair of split gripper arms are pivoted at their proximal ends to the support head of the arm base in a diametrically opposed relationship with respect to the first pair of arms for swinging movement between an idle position wherein the second pair of arms lie side to side and an acting position wherein the second pair of arms are placed end to end. An arm actuator is operatively connected to the first and second pairs of arms for causing each pair of arms to swing from the idle position to the acting position.

6 Claims, 5 Drawing Sheets

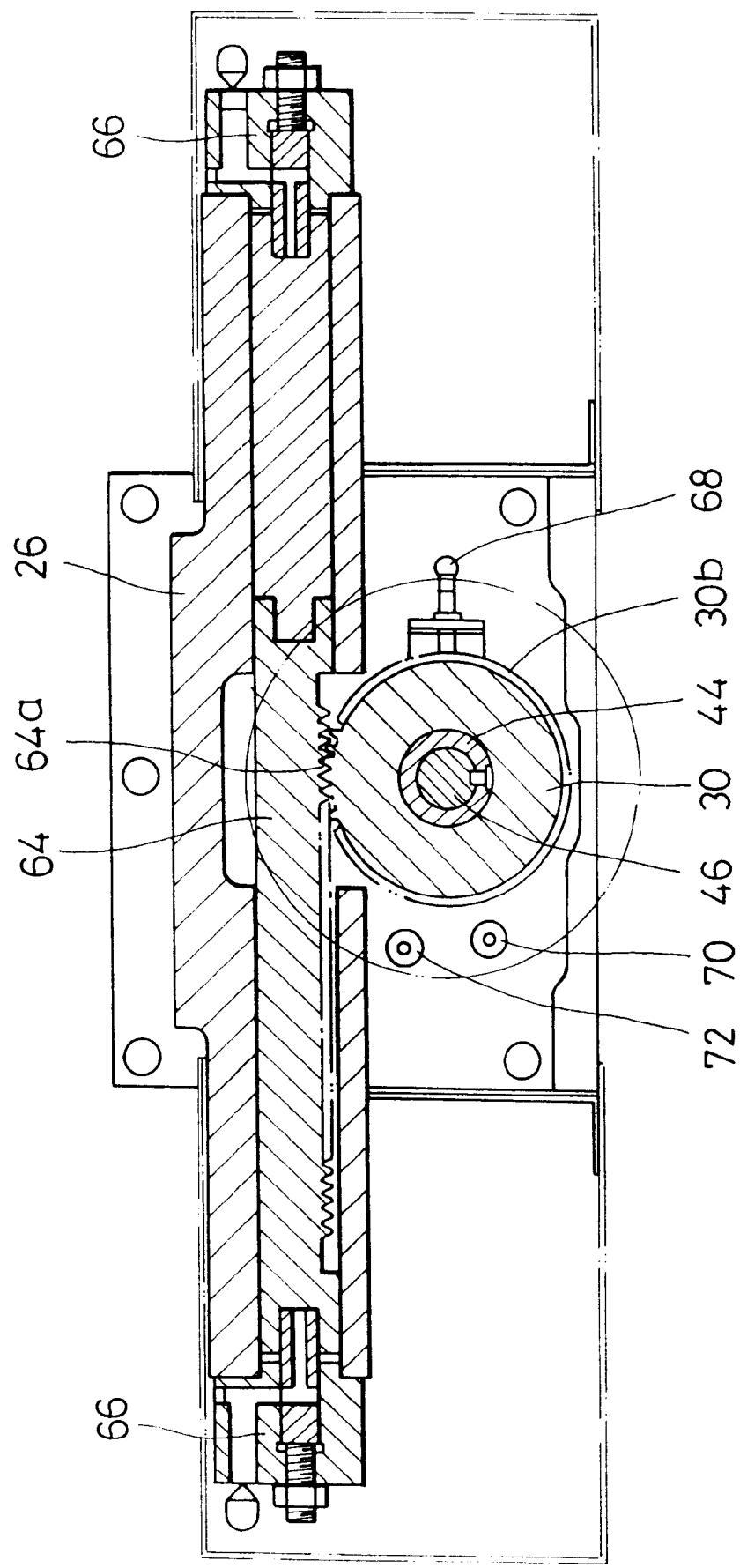

AUTOMATIC PALLET CHANGER FOR MACHINE TOOLS WITH SPLIT GRIPPER ARMS

FIELD OF THE INVENTION

The present invention relates generally to machine tools that perform various cutting operations for workpieces and, more specifically, to an automatic pallet changer for machining centers of the type having an arm base, split gripper arms swingably attached to the am base and a front door fixedly secured to the arm base for unitary rotation therewith.

DESCRIPTION OF THE RELATED ART

Most of the state-of-the-art machining centers make use of an automatic pallet changer, often referred to as "APC" by its acronym, which can change a pair of workpiece supporting pallets between a rest position and a cutting position each time the cutting operation for one workpiece comes to an end. The cutting operation is carried out within a cutting compartment surrounded by a machine housing which has an access opening in front thereof. A door is openably mounted on the machine housing to close off the access opening, thereby inhibiting chips or cutting fluid from coming out of the cutting compartment in the workpiece cutting process.

To change the pair of pallets each located at the rest position and the cutting position, the first step in the prior art machining center is to open the door, after which the automatic pallet changer will cause the pallets to be changed with each other by way of performing a given number of pallet changing substeps. The last step is to close the door to physically isolate the cutting compartment from the outside. Opening and closing the door in the manner noted above is however highly cumbersome and time-consuming to perform. Moreover, a specially designed door operating device has to be provided in order to open and close the door on a pallet changing time basis, which would lead to an increased complexity of the machining center and would eventually make the machining center costly.

As a solution to these drawbacks, U.S. Pat. No. 5,531,004, owned by the assignee of the instant invention, teaches a machining center that can enable a door to be open and closed in synchronism with a pallet changing operation and without resort to a separate door operating equipment. The door in this patent remains pivotally attached to the housing of the machining center and is selectively engageable at its lower edge with the rotary arm of an automatic pallet changer. Engagement of the door and the rotary arm occurs when the rotary arm is turned 90 degrees from its rest position and then moved upwards into contact with the lower edge of the door. Such engagement allows the door to be rotated together with the rotary arm while the latter is caused to rotate to change the pallet in a cutting compartment with the one located in front of the machining center. At the end of the pallet changing operation, the rotary arm would be disengaged from the door, permitting it to close the front opening of the machining center.

With the machining center disclosed in the '004 patent, a pivot arrangement is needed to mount the door to the frame of the machining center so that it can be rotated freely by the rotary arm. More importantly, it is necessary to employ a specially designed locking device to allow selective engagement of the rotary arm with the door when the pallet changing operation proceeds. This may render the machining center structurally complicated and easy to fail. Furthermore, the rotary arm in the '004 patent and other prior art pallet changers have to be interlocked with the pallets during the pallet changing operation, which would require an extra time-consuming step and would result in a delayed pallet changing time.

SUMMARY OF THE INVENTION

An object of the invention is to provide an automatic pallet changer for a machine tool that allows a front door to remain fixedly attached to the pallet changer before, during and after the pallet changing operation proceeds.

Another object of the invention is to provide an automatic pallet changer for a machine tool that can eliminate the need to interlock a rotary arm with pallets throughout the pallet changing process.

With these objects in mind, the present invention provides an automatic pallet changer for use in changing an inner pallet lying inside a cutting compartment of a machine tool with an outer pallet located outside the cutting compartment, comprising: a housing; an arm base elevatably and rotatably fitted to the housing, the arm base having a rotary shaft and a support head mounted on the top of the rotary shaft; a first pair of split gripper arms each pivoted at their proximal ends to the support head of the arm base for swinging movement between an idle position wherein the first pair of arms lie side to side and an acting position wherein the first pair of arms are placed end to end; a second pair of split gripper arms each pivoted at their proximal ends to the support head of the arm base in a diametrically opposed relationship with respect to the first pair of arms for swinging movement between an idle position wherein the second pair of arms lie side to side and an acting position wherein the second pair of arms are placed end to end; and an arm actuator operatively connected to the first and second pairs of arms for causing each pair of arms to swing from the idle position to the acting position.

BRIEF DESCRIPTION OF THE DRAWINGS

The above and other objects, features, advantages of the invention will become apparent from a review of the following detailed description of the preferred embodiment taken in conjunction with the accompanying drawings, in which:

FIG. 5 is a sectional view taken along line V—V in FIG. 4, showing a rack and pinion arrangement incorporated in the pallet changer to turn the arm base together with the gripper arms.

DETAILED DESCRIPTION OF THE PREFERRED EMBODIMENT

Figure 1:
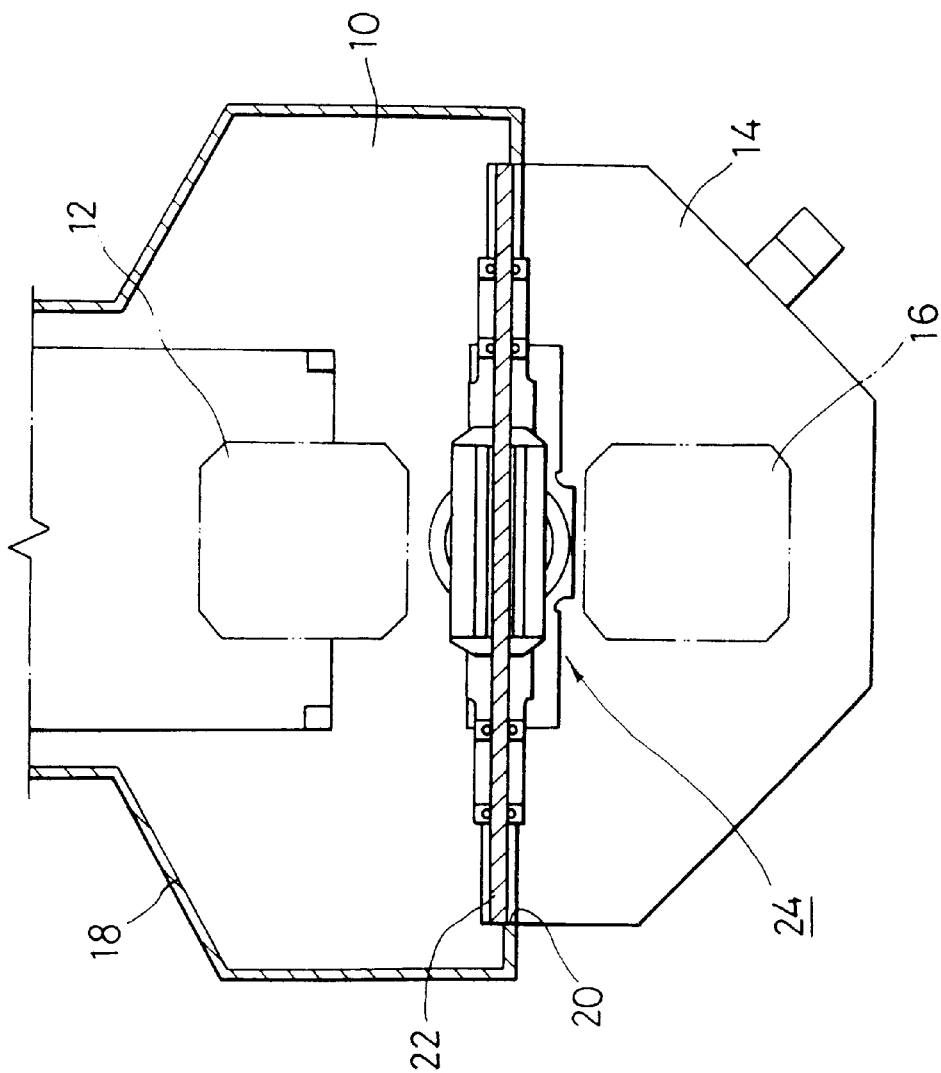
FIG. 1 is a schematic, top sectional view of a machining center which employs the automatic pallet changer in accordance with the invention, with portions thereof removed for simplicity.

Referring now to FIG. 1, there is shown, as an example of machine tools to which the invention may be applicable, a horizontal machining center adapted for use in cutting a workpiece into a desired shape. The machining center comprises, but is not limited to, a bed 10 that holds an inner pallet 12 on its table 10 in a readily changeable fashion and a support die 14 disposed in front of the table 10 to support an outer pallet 16 to be changed with the inner pallet 12. The inner pallet 12 assists in supporting a workpiece at a cutting position, while the outer pallet 16 serves to support the workpiece at a rest position. A machine housing 18 extends upwardly from the bed 10 to define a cutting compartment which encloses the inner pallet 12. The machine housing 18 has a frontal access opening 20 that provides access to the inner pallet 12 and the workpiece lying thereon. A front door 22 is provided at the front end of the machine housing 18 to openably close the access opening 20. Underneath the front door 22, there is disposed an automatic pallet changer 24 whose features will now be set forth in detail.

Figure 2:
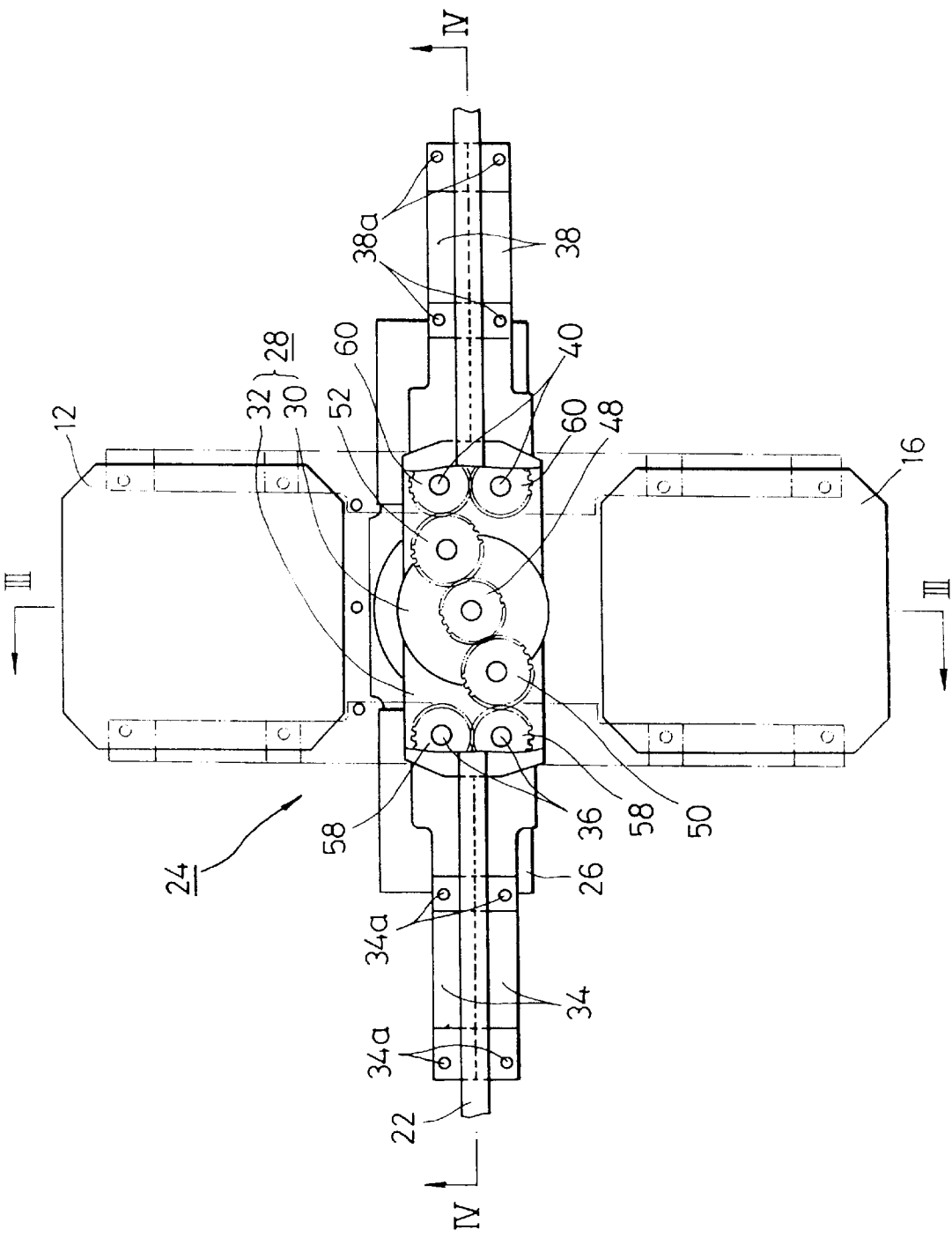
FIG. 2 is a partially cutaway, enlarged, top view of the automatic pallet changer, with the phantom line showing gripper arms swung into an acting position.
Figure 3:
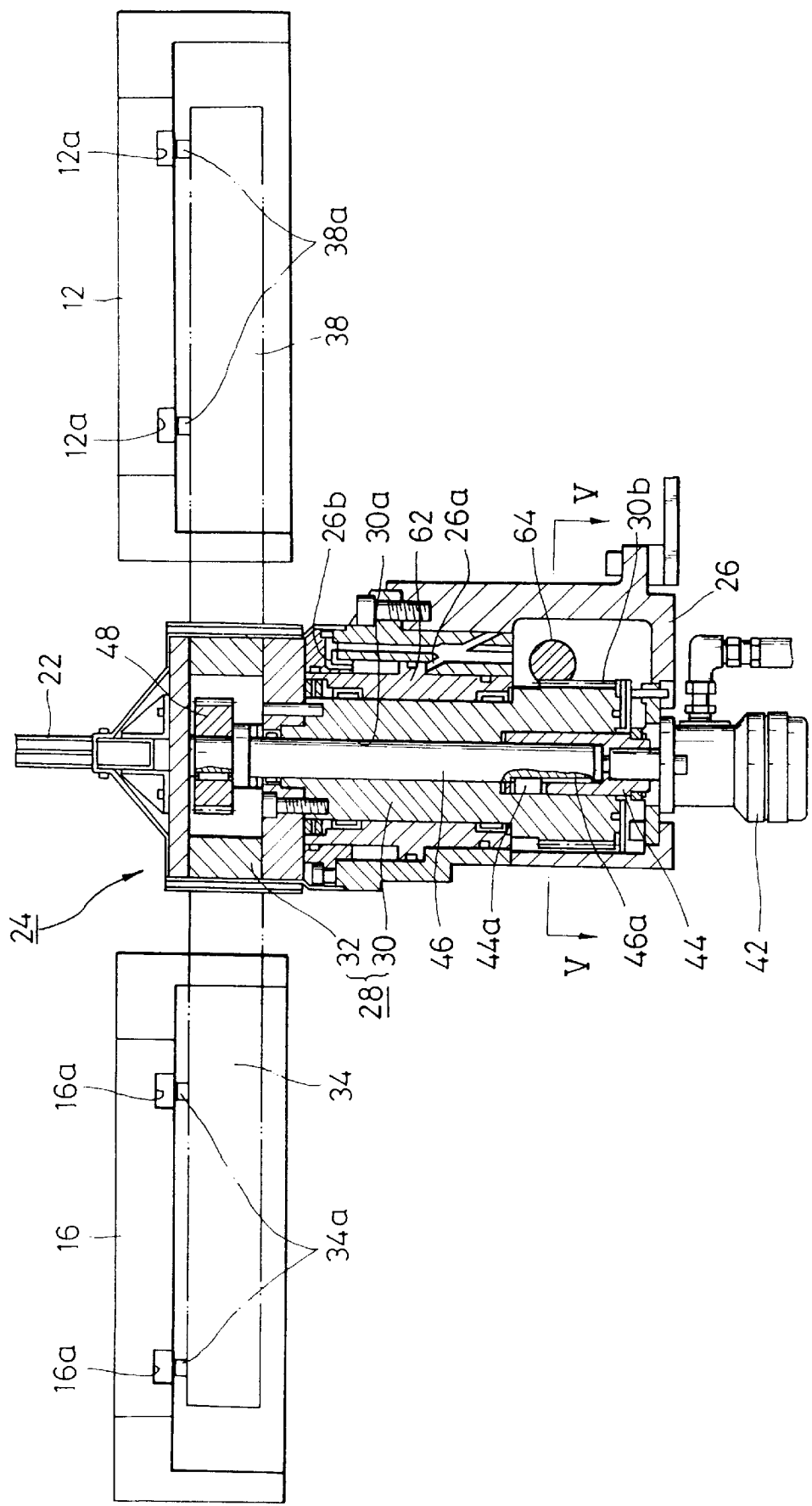
FIG. 3 is a sectional view taken along line III—III in FIG. 2, with the phantom line illustrating the gripper arms in the acting position.
Figure 4:
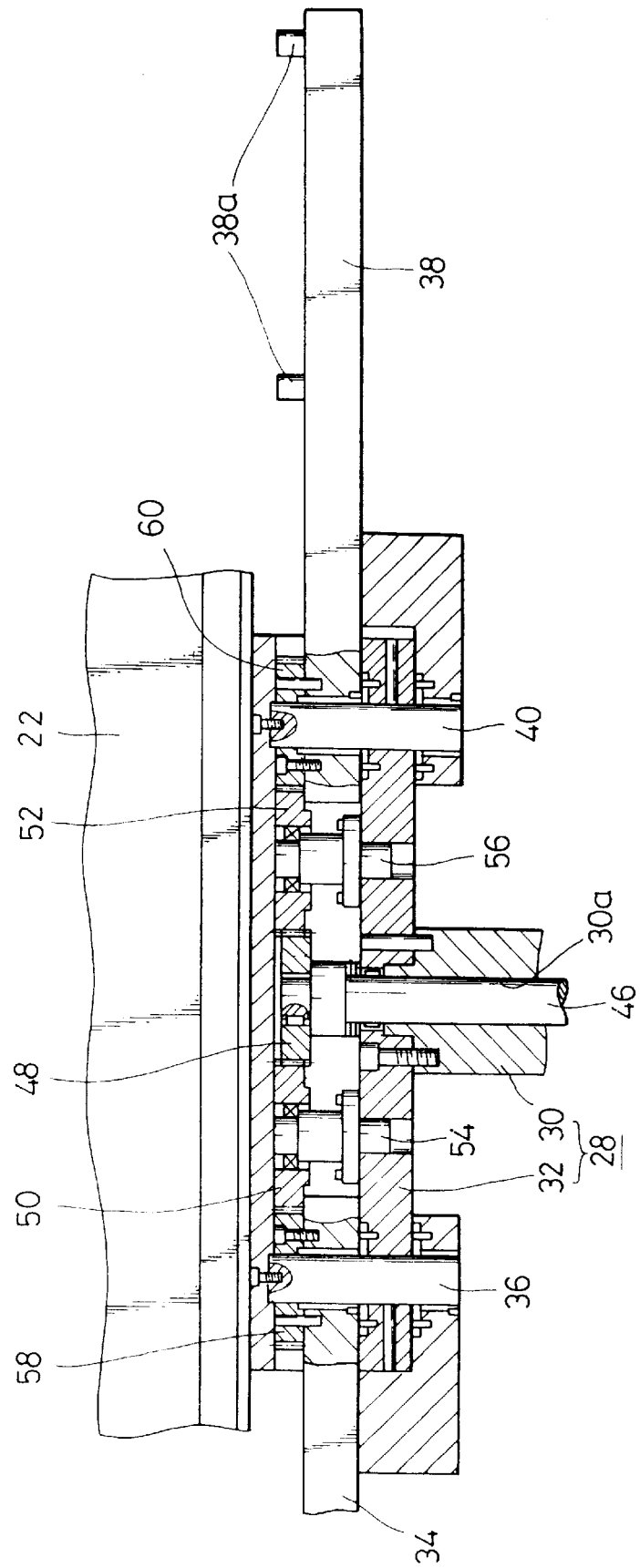
FIG. 4 is a sectional view taken along line IV—IV in FIG. 2, best showing a gear train operatively connecting a center gear shaft with the gripper arms.

Turning to FIGS. 2 through 4, it will be appreciated that the automatic pallet changer 24 includes a changer housing 26 and an arm base 28 elevatably and rotatably fitted to the changer housing 26. The arm base 28 is provided with a rotary shaft 30 which has an axial bore 30a extending through the full length thereof. At the lower circumference of the rotary shaft 30, a pinion gear 30b is integrally formed so as to mesh with a rack described hereinbelow. A further element of the arm base 28 is a support head 32 which has a length generally equal to or somewhat greater than the width of the pallet 12 or 16.

It should be noted that the front door 22 is fixedly secured at its bottom edge to the support head 32 of the arm base 28 for up/down and swinging movement together with the arm base 28, as clearly ascertainable in FIG. 3. This is one of the key innovative features of the invention whereby the need is eliminated either to separately operate the front door or to have the door selectively engaged with the pallet changer in the pallet changing process.

As best shown in FIG. 2, a first pair of split gripper arms 34 are pivoted at their proximal ends to one longitudinal end of the support head 32 so that they can be swung about pivot pins 36 between an idle position shown in solid lines and an acting position about 90 degrees off the idle position as shown in phantom lines in FIG. 2. The first pair of gripper arms 34 will lie side to side and remain retracted from the pallets 12, 16 in the idle position, while they will be placed end to end and extended underneath the pallets 12, 16 in the acting position. Each of the first pair of gripper arms 34 has a couple of upwardly projecting locking pins 34a disposed along the length thereof some distance off each other. As depicted in FIGS. 3 and 4, the locking pins 34a are adapted to come into sliding engagement with locking holes 12a or 16a of the pallets 12 or 16 as the arm base 28 and the gripper arms 34 are lifted up in the manner stated below. The length of the respective gripper arm 34 is preferably such that the pallets 12, 16 may be stably supported at their lateral edges by the gripper arms 34.

A second pair of split gripper arms 38 are pivoted at their proximal ends to the other longitudinal end of the support head 32 in a diametrically opposed relationship with respect to the first pair of split gripper arms 34. The second pair of gripper arms 38 can be swung about pivot pins 40 between an idle position shown in solid lines and an acting position about 90 degrees off the idle position as shown in phantom lines in FIG. 2. The second pair of gripper arms 38 will lie side to side and remain retracted from the pallets 12, 16 in the idle position, while they will be placed end to end and extended underneath the pallets 12, 16 in the acting position. Each of the second pair of gripper arms 38 is provided with a couple of upwardly projecting locking pins 38a disposed along the length thereof some distance off each other. As depicted in FIGS. 3 and 4, the locking pins 38a are designed to come into sliding engagement with locking holes 12a or 16a of the pallets 12 or 16 as the arm base 28 and the gripper arms 38 are lifted up in the manner stated below. The length of the respective gripper arm 38 is preferably such that the pallets 12, 16 may be stably supported at their lateral edges by the gripper arms 38.

Referring to FIG. 3, it will be seen that a hydraulic motor 42 is mounted to the bottom of the changer housing 26 and has a cup-shaped output shaft 44 extending into the axial bore 30a of the rotary shaft 30. A center gear shaft 46 runs through the axial bore 30a, with its lower end received in the output shaft 44 so that the center gear shaft 46 may be axially extended with respect to the output shaft 44. The output shaft 44 is provided with a key 44a which in turn slidingly engages with a key slot 46a of the center gear shaft 46. This will enable the torque of the hydraulic motor 42 to be delivered to the center gear shaft 46, while allowing relative sliding movement of the center gear shaft 46 to the output shaft 44.

Fixedly carried on the top of the center gear shaft 46 is a drive gear 48 that would mesh with first and second intermediate gears 50, 52 journalled on the support head 32 via stud pins 54, 56 as most clearly represented in FIGS. 2 and 4. A first pair of driven gears 58 are affixed to the proximal ends of the first pair of gripper arms 34 in a manner that they may be intermeshed with each other for rotation in unison but in the opposite directions. One of a the first pair of driven gears 58 remains meshed with the first intermediate gear 50 to receive torque from the drive gear 48. Similarly, a second pair of driven gears 60 are affixed to the proximal ends of the second pair of gripper arms 38 in a manner that they may be intermeshed with each other for rotation in unison but in the opposite directions. One of the second pair of driven gears 60 remains meshed with the second intermediate gear 52 to receive torque from the drive gear 48. By way of the center gear shaft 46, the drive gear 48, the intermediate gears 50, 52 and the driven gears 58, 60, rotation of the hydraulic motor 42 can be delivered to the first and the second pairs of gripper arms 34, 38.

With reference again to FIG. 3, a hydraulic cylinder 62 of generally sleeve shape is slidably fitted inside the changer housing 26 and interlocked with the rotary shaft 30 of the arm base 28. The hydraulic cylinder 62 may extend to lift up the arm base 28 and the gripper arms 34, 38 into an up position when pressure fluid is introduced through a first port 26a. On the contrary, when the pressure fluid is admitted through a second port 26b, the hydraulic cylinder 62 will be retracted to permit the arm base 28 and the gripper arms 34, 38 to be lowered down into a down position as indicated in FIG. 3.

Referring collectively to FIGS. 3 and 5, it will be noted that a reciprocating rod 64 runs across the rotary shaft 30 of the arm base 28 and a slidably fitted to the changer housing 26 for linear motion relative to the rotary shaft 30. The reciprocating rod 64 has a length of rack 64a in meshing engagement with the pinion gear 30b of the rotary shaft 30. At opposite ends of the reciprocating rod 64, there are provided hydraulic actuators 66 that serve to cause linear motion of the reciprocating rod 64, thereby enabling the rotary shaft 30 to turn 180 degrees in forward or reverse direction such that the pallets 12, 16 on the gripper arms 34, 38 can be changed with one another. As shown only in FIG. 5, the rotary shaft 30 carries a dog 68 which would strike a first limit switch 70 at the end of forward rotation of the rotary shaft 30 and a second limit switch 72 at the end of reverse rotation thereof. When struck, the first and the second limit switches 70, 72 will issue electric signals to a controller (not shown) which in turn have the hydraulic actuators 66 stop further movement of the reciprocating rod 64.

Based on the embodiment of the automatic pallet changer described above, the pallet changing process will be set forth hereinbelow.

The hydraulic motor 42 is first rotated forwards to turn the drive gear 48 on the top of the center gear shaft 46. This will enable the first pair of driven gears 58 to rotate in the opposite directions with respect to one another, thus causing the first pair of gripper arms 34 to swing 90 degrees from the idle position into the acting position shown in phantom lines in FIG. 2, whereby the first pair of gripper arms 34 lie just underneath the lateral edges of the inner and the outer pallets 12, 16. Such operation would hold true for the second pair of driven gears 60 and hence the second pair of gripper arms 38.

Once the gripper arms 34, 38 are extended into the acting position, the next step is to unclamp the inner pallet 12 by way of activating a clamp device built in the machining center, to place it in a liftable condition. Subsequently, the hydraulic cylinder 62 extends upwards to bring the arm base 28 and the gripper arms 34, 38 into the up position, in which time the locking pins 34a, 38a of the gripper arms 34, 38 would be slid into the locking holes 12a, 16a of the inner and the outer pallets 12, 16 and at the same time, the inner and the outer pallets 12, 16 would be separated from the table 10 and the support die 14 shown only in FIG. 1.

The hydraulic actuator 66 will then cause linear motion of the reciprocating rod 64 whereby the arm base 28 is rotated 180 degrees to change the inner pallet 12 and the outer pallet 16 with each other. The front door 22 is subjected to unitary rotation with the arm base 28 at this time, thanks to the fixed mounting of the front door 22 on the top of the arm base 28. As soon as the inner pallet 12 is superseded by the outer pallet 16 in this way, the hydraulic cylinder 62 will be retracted to bring the arm base 28 back to the down position. This will permit the inner and the outer pallets 12, 16 to be laid down on the table 10 and the support die 14 of the machining center, with the locking pins 34a, 38a of the gripper arms 34, 38 pulled out of the locking holes 12a, 16a of the inner and the outer pallets 12, 16.

Then the inner pallet 12 will be clamped on the table 10 against any inadvertent movement. At the last step, the gripper arms 34, 38 are swung 90 degrees from the acting position back to the idle position by means of the hydraulic motor 42 to thereby terminate the pallet changing procedure.

While the invention has been shown and described with reference to a preferred embodiment, it should be apparent to one of ordinary skill that many changes and modifications may be made without departing from the spirit and scope of the invention as defined in the claims.

What is claimed is:

1. An automatic pallet changer for use in changing an inner pallet lying inside a cutting compartment of a machine tool with an outer pallet located outside the cutting compartment comprising:

a housing;

an arm base elevatably and rotatably fitted to the housing, the arm base having a rotary shaft and a support head mounted on a top of the rotary shaft;

a first pair of split gripper arms each pivoted at proximal ends thereof to the support head of the arm base, for swinging movement between a first idle position wherein the first pair of split gripper arms lie side to side and a first acting position wherein the first pair of arms are placed end to end;

a second pair of split gripper arms each pivoted at proximal ends thereof to the support head of the arm base in a diametrically opposed relationship with respect to the first pair of split gripper arms, for swinging movement between a second idle position wherein the second pair of split gripper arms lie side to side and a second acting position wherein the second pair of split gripper arms are placed end to end;

a hydraulic motor mounted to the housing at a position below the rotary shaft of the arm base; and motion delivery means for delivering the rotating movement of the hydraulic motor to the first and second pairs of split gripper arms, the motion delivery means comprising a center gear shaft extendibly coupled at a bottom thereof to the hydraulic motor and vertically extending through the rotary shaft of the arm base, a drive gear fixedly secured to a top of the center gear shaft, driven gears provided at the proximal ends of each of the split gripper arms, respectively, a first intermediate gear rotatingly journalled on the support head of the arm base for meshing with the drive gear and the driven gear at the proximal end of one of the first pair of split gripper arms, and a second intermediate gear rotatingly journalled on the support head of the arm base for meshing with the drive gear and the driven gear at the proximal end of one of the second pair of split gripper arms.

2. The automatic pallet changer as recited in claim 1, further comprising a front door fixedly secured to the support head of the arm base for rotation therewith each time the arm base is caused to rotate.

3. The automatic pallet changer as recited in claim 1, further comprising means for lifting the arm base to bring the first and the second pairs of split gripper arms into engagement with the respective one of the inner and the outer pallets.

4. The automatic pallet changer as recited in claim 3, wherein the lifting means comprises a hydraulic cylinder slidably fitted inside the housing and interlocked with the rotary shaft of the arm base.

5. The automatic pallet changer as recited in claim 1, further comprising means for rotating the arm base to enable the inner and the outer pallets to be changed with each other.

6. The automatic pallet changer as recited in claim 5, wherein the rotating means comprises:

a pinion gear integrally formed with the rotary shaft of the arm base;

a reciprocating rod extending across the rotary shaft and having a rack intermeshed with the pinion gear; and means for causing linear motion of the reciprocating rod to turn the rotary shaft.

* * * * *